United States Patent
Sohn et al.

(10) Patent No.: US 9,382,385 B2
(45) Date of Patent: *Jul. 5, 2016

(54) LACTIDE COPOLYMER, AND RESIN COMPOSITION AND FILM COMPRISING SAME

(71) Applicant: LG CHEM, LTD., Seoul (KR)

(72) Inventors: Jung Min Sohn, Daejeon (KR); Seung Young Park, Daejeon (KR); Kyung Seog Youk, Daejeon (KR); Seung Ho Choi, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/434,353

(22) PCT Filed: Dec. 4, 2013

(86) PCT No.: PCT/KR2013/011170
§ 371 (c)(1),
(2) Date: Apr. 8, 2015

(87) PCT Pub. No.: WO2014/088319
PCT Pub. Date: Jun. 12, 2014

(65) Prior Publication Data
US 2015/0274898 A1 Oct. 1, 2015

(30) Foreign Application Priority Data

Dec. 6, 2012 (KR) .................. 10-2012-0141061
Dec. 4, 2013 (KR) .................. 10-2013-0149791

(51) Int. Cl.
| | | |
|---|---|---|
| C08G 63/91 | (2006.01) | |
| C08G 81/00 | (2006.01) | |
| C08J 5/18 | (2006.01) | |
| C08G 63/664 | (2006.01) | |
| C08G 65/32 | (2006.01) | |

(52) U.S. Cl.
CPC .............. *C08G 81/00* (2013.01); *C08G 63/664* (2013.01); *C08J 5/18* (2013.01); *C08J 2353/00* (2013.01); *C08J 2367/04* (2013.01); *C08J 2387/00* (2013.01)

(58) Field of Classification Search
CPC ....... C08L 67/04; C08G 63/08; C08G 63/912
USPC ............................................ 525/411, 440.12
See application file for complete search history.

(56) References Cited

U.S. PATENT DOCUMENTS

| | | | |
|---|---|---|---|
| 4,826,945 A | 5/1989 | Cohn et al. | |
| 2014/0163178 A1* | 6/2014 | Sohn .................. | C08G 63/823 525/440.12 |

FOREIGN PATENT DOCUMENTS

| | | |
|---|---|---|
| EP | 2 719 714 A2 | 4/2014 |
| JP | 09-143239 A | 6/1997 |
| JP | H1135655 A | 2/1999 |
| JP | 2000-230029 A | 8/2000 |
| JP | 3501249 B3 | 3/2004 |
| JP | 2005-008897 A | 1/2005 |
| JP | 2009-518129 A | 5/2009 |
| KR | 10-1995-0702600 A | 11/2000 |
| KR | 10-2001-0053259 A | 6/2001 |
| KR | 10-2010-0091092 A | 8/2010 |
| KR | 10-2011-0036340 A | 4/2011 |
| KR | 10-2012-0094552 A | 8/2012 |
| KR | 10-1191967 B1 | 10/2012 |
| KR | 10-2012-0135889 A | 12/2012 |
| KR | 10-2012-0135890 A | 12/2012 |

* cited by examiner

*Primary Examiner* — Terressa Boykin
(74) *Attorney, Agent, or Firm* — Dentons US LLP (57) ABSTRACT

The present invention relates to a lactide copolymer exhibiting excellent flexibility and having more improved processability and productivity at the time of performing an extrusion and molding process, and a resin composition and film including the same, wherein the lactide copolymer includes a predetermined number of block copolymer repeating units in which hard segments of polylactide repeating units are bound to both ends of soft segments of polyether polyol repeating units, and has a weight-average molecular weight of 150,000 to 300,000, and has a melt index y (MI; g/10 min) satisfying a specific relationship, the MI being measured under a load of 2.16 kg and at a temperature of x□ between 170□ and 210□.

16 Claims, 1 Drawing Sheet

LACTIDE COPOLYMER, AND RESIN COMPOSITION AND FILM COMPRISING SAME

This application is a National Stage Entry of International Application No. PCT/KR2013/011170, filed on Dec. 4, 2013, which claims priority to and the benefit of Korean Patent Application No. 10-2012-0141061, filed on Dec. 6, 2012 and Korean Patent Application No. 10-2013-0149791 filed, on Dec. 4, 2013, all of which are hereby incorporated herein by reference in their entirety.

TECHNICAL FIELD

The present invention relates to a lactide copolymer, and a resin composition and a film including the same. More specifically, the present invention relates to a lactide copolymer exhibiting excellent flexibility and having more improved processability and productivity at the time of performing an extrusion and molding process, and a resin composition and film including the same.

BACKGROUND

A polylactide (or polylactic acid) resin is a kind of a resin including repeating units represented by General Formula below. Unlike existing crude oil-based resins, the polylactide resin is based on biomass, which is usable as a renewable resource, and less discharges $CO_2$ which is a global warming gas, in production, as compared to the existing resins, and has appropriate mechanical strength corresponding to the existing crude oil-based resin, together with eco-friendly characteristics such as biodegradability by moisture and microorganisms when being buried.

[General Formula]

The polylactide resin is generally used as disposable packaging/containers, coatings, foamings, films/sheets, fibers, and the like. However, when the polylactide resin, or a copolymer including the same are processed to be a film form, and the like, and used as a packaging film, and the like, there are disadvantages in that the polylactide resin, or a copolymer including the same is weak against impact and flexibility is deteriorated. In particular, due to deteriorated flexibility, extremely large noise occurs at the time of manufacturing the polylactide resin to be a film form, which has limitation in actual commercialization.

In addition, since the polylactide resin has significantly low fluidity in a molten state, it is not easy to perform an extrusion process for manufacturing a film or a sheet, and a large load may be applied to a screw of an extruder at the time of performing the extrusion process. Therefore, rapid mass production of the polylactide resin may be hindered, and productivity of the product such as the film may be largely deteriorated.

SUMMARY OF INVENTION

The present invention provides a lactide copolymer exhibiting excellent flexibility and having more improved processability and productivity at the time of performing an extrusion and molding process.

The present invention has also been made in an effort to provide a resin composition and a film including the lactide copolymer.

An exemplary embodiment of the present invention provides a lactide copolymer including:

block copolymer repeating units in which hard segments of polylactide repeating units are bound to both ends of soft segments of polyether polyol repeating units, the block copolymer repeating unit being represented by Chemical Formula 1, wherein the lactide copolymer has a weight average molecular weight of about 150,000 to 300,000, and a melt index y (MI; g/10 min) satisfying about $0.0043x^2-1.3026x+99.2 \leq y \leq$ about $0.04x^2-13.06x-1073.7$, the MI being measured under a load of 2.16 kg and at a temperature of x□ between about 170□ and 210□:

[Chemical Formula 1]

in Chemical Formula 1, D is a C2 to C10 linear or branched alkylene group, x is each independently an integer of 30 to 500, and n is an integer of 30 to 1000.

In addition, another exemplary embodiment of the present invention provides a resin composition and a film including the lactide copolymer as described above.

DESCRIPTION OF EMBODIMENTS

Hereinafter, the lactide copolymer, and the resin composition and the film including the lactide copolymer according to an exemplary embodiment of the present invention are described in more detail.

According to an exemplary embodiment of the present invention, a lactide copolymer includes: block copolymer repeating units in which hard segments of polylactide repeating units are bound to both ends of soft segments of polyether polyol repeating units, the block copolymer repeating unit being represented by Chemical Formula 1, wherein the lactide copolymer has a weight average molecular weight of about 150,000 to 300,000, and a melt index y (MI; g/10 min) satisfying about $0.0043x^2-1.3026x+99.2 \leq y \leq$ about $0.04x^2-13.06x+1073.7$, the MI being measured under a load of 2.16 kg and at a temperature of x□ between about 170□ and 210□:

[Chemical Formula 1]

in Chemical Formula 1, D is a C2 to C10 linear or branched alkylene group, x is each independently an integer of 30 to 500, and n is an integer of 30 to 1000.

The lactide copolymer according to an exemplary embodiment of the present invention may include the block copolymer repeating units in which the hard segments of the polylactide repeating units are bound to the both ends of the soft segments of the polyether polyol repeating units derived from polyalkylene glycol, or the like, the block copolymer repeating unit being represented by Chemical Formula 1. For example, the lactide copolymer may include two or more of the block copolymer repeating units linked with each other via a urethane linking group.

According to a structure of the block copolymer repeating units and a selective linking structure of these repeating units, the lactide copolymer may include a predetermined number of soft segments to exhibit excellent flexibility as compared to a polylactide resin or a lactide copolymer known in the art. In addition, the soft segments for improving flexibility may be bound in the lactide copolymer with the above-described linking structure, which decreases a possibility in which the soft segments are discharged while being processed or used. Therefore, the lactide copolymer may overcome problems of the existing polylactide resins, and may exhibit and maintain excellent flexibility which is appropriate for being used as packaging materials, and the like.

In addition, the lactide copolymer may be easily prepared and provided so as to have larger molecular weight according to the above-described block copolymer repeating units and the selective linking structure thereof. For example, the lactide copolymer according to an exemplary embodiment of the present invention may have a high weight average molecular weight of about 150,000 to 300,000, or about 170,000 to 230,000. Due to high molecular weight, the lactide copolymer may satisfy excellent mechanical physical properties and flexibility at the same time.

In addition, when a melt index of the lactide copolymer is measured under a load of 2.16 kg and at a temperature between about 170□ and 210□ corresponding to an extrusion molding temperature, or at a temperature between about 170□ and 190□, the melt index y (MI; g/10 min) according to a temperature of x□ may satisfy a specific relationship: about $0.0043x^2-1.3026x+99.2 \leq y \leq$ about $0.04x^2-13.06x-1073.7$. It may be confirmed that the lactide copolymer satisfying the above-described relationship according to an exemplary embodiment may have high molecular weight, excellent fluidity at an extrusion molding temperature, and a large degree of increase in fluidity according to an increase in temperature. Therefore, the lactide copolymer according to an exemplary embodiment may exhibit excellent processability due to extrusion molding and may significantly decrease a load to be applied to a screw, or the like, of an extruder during extrusion processing.

The melt index characteristic for each temperature satisfied in the lactide copolymer according to an exemplary embodiment of the present invention may be achieved by structural characteristics of the lactide copolymer to be described below, for example, a linking structure linking the block copolymer repeating units, an equivalent ratio thereof, or the like.

Eventually, the lactide copolymer according to an exemplary embodiment of the present invention may overcome problems of the existing polylactide resins, and may exhibit more improved processability and product productivity for manufacturing a film, and the like, together with excellent mechanical physical properties and flexibility.

Hereinafter, the lactide copolymer, and the like, are described in more detail.

As described above, the lactide copolymer according to an exemplary embodiment may include the block copolymer repeating units in which hard segments of the polylactide repeating units are bound to both ends of the soft segments of the polyether polyol repeating units. In addition, the lactide copolymer may include two or more of the block copolymer repeating units, and for example, the block copolymer repeating units may be linked with each other via a urethane linking group.

In the above-described lactide copolymer, the urethane linking group may be induced from a polyvalent isocyanate compound having 2 or more equivalents of an isocyanate group per a molecule, and for example, the urethane linking group may include two or more of urethane bonds obtained by a reaction of a terminal hydroxy group derived from the polylactide repeating unit and the polyvalent isocyanate compound. That is, the block copolymer repeating units may be linked with each other by two or more of the urethane bonds included in the urethane linking group.

More specifically, the polyvalent isocyanate compound for forming the urethane linking group may be an isocyanate compound having more than about 2, or more than about 2 to less than 3, or about 2.1 to 2.9, or about 2.2 to 2.8 equivalents of an average isocyanate group per a molecule.

Here, a compound having more than about 2, or more than about 2 to less than 3 equivalents of an average isocyanate group per a molecule may include a mixture (for example, an equivalent of an average isocyanate group per a molecule=more than 2 to less than 3, or the like) of a diisocyanate compound having two isocyanate groups per a molecule (an equivalent of an average isocyanate group per a molecule=2) and a polyvalent isocyanate compound having 3 or more isocyanate groups per a molecule (an equivalent of an average isocyanate group per a molecule=3 or more). In one example, one urethane linking group derived from the polyvalent isocyanate compound may include a linear linking group including 2 urethane bonds and a branched linking group including 3 or more urethane bonds.

Therefore, the plurality of block copolymer repeating units included in the lactide copolymer may be linked with each other, for example, via a linking group including the linear urethane linking group and the branched urethane linking group.

Due to the structure of the above-described block copolymer repeating unit and the linking form thereof, the lactide copolymer may exhibit characteristics as below.

First, the lactide copolymer may include the soft segments of the polyether polyol repeating units to exhibit excellent flexibility, and as described above, there is little possibility in which the soft segments are discharged while being processed or used, due to the above-described linking structure. Therefore, the lactide copolymer itself may exhibit excellent flexibility which is not capable of being achieved by the existing polylactide resins and may be used to manufacture and provide a film having excellent flexibility and elongation, and the like. In addition, due to the linking structure, the lactide copolymer and the film obtained therefrom, and the like, may have larger molecular weight and excellent mechanical physical properties, and may easily control general physical properties.

In addition, in the lactide copolymer, the plurality of block copolymer repeating units as described above may be linked with each other via a urethane linking group including both of the linear urethane linking group and the branched urethane linking group. In this case, the lactide copolymer may include linear copolymer chains and branched copolymer chains at the same time. As a result, the lactide copolymer may have a larger molecular weight and may have the melt index y (MI; g/10 min) according to a temperature of x□ which satisfies the specific relationship: about $0.0043x^2-1.3026x+99.2 \leq y \leq$ about $0.04x^2-13.06x+1073.7$, wherein the temperature of x□ is between about 170□ and 210□ corresponding to an extrusion molding temperature, or at a temperature between about 170☐ and 190☐. This melt index was not capable of being achieved by the existing polylactide resin at each temperature range, which indicates that the lactide copolymer according to an exemplary embodiment of the present invention may have a larger molecular weight, excellent fluidity at an extrusion molding temperature, and a large degree of increase in fluidity according to an increase in temperature. Due to the large fluidity at a melting processing temperature, the lactide copolymer according to an exemplary embodiment may exhibit excellent mechanical physical properties according to a high molecular weight, and may have more improved melting processability. In addition, due to the large fluidity, a load applied to a screw, and the like, of an extruder at the time of performing melting and extrusion processes may be significantly decreased, such that products such as a film, and the like, may be easily processed and productivity thereof may be significantly improved.

Meanwhile, the polyvalent isocyanate compound for forming the above-described urethane linking group may include a mixture of a diisocyanate compound and a polyvalent isocyanate compound having 3 or more equivalents of an isocyanate group, in order to satisfy the equivalent range of more than about 2, or more than about 2 to less than 3 as described above.

Here, specific examples of the diisocyanate compound may include ethylene diisocyanate, 1,4-tetramethylene diisocyanate, 1,6-hexamethylene diisocyanate (HDI), 1,2-dodecane diisocyanate, cyclohexane-1,3-diisocyanate, cyclohexane-1,4-diisocyanate, 2,4-hexahydrotoluene diisocyanate, 2,6-hexahydrotoluene diisocyanate, hexahydro-1,3-phenylene diisocyanate, hexahydro-1,4-phenylene diisocyanate, perhydro-2,4-diphenylmethane diisocyanate, perhydro-4,4'-diphenylmethane diisocyanate, 1,3-phenylene diisocyanate, 1,4-phenylene diisocyanate, 1,4-stilbene diisocyanate, 3,3'-dimethyl-4,4'-diphenylene diisocyanate, toluene 2,4-diisocyanate (TDI), toluene 2,6-diisocyanate, diphenylmethane-2,4'-diisocyanate (MDI), diphenylmethane-2,2'-diisocyanate, diphenylmethane-4,4'-diisocyanate and naphthylene-1,5-diisocyanate, and the polyvalent isocyanate compound having 3 or more equivalents of the isocyanate group may be selected from the group consisting of an oligomer of the diisocyanate compound, a polymer of the diisocyanate compound, a cyclic polymer of the diisocyanate compound, hexamethylene diisocyanate isocyanurate (HDI isocyanurate), a triisocyanate compound and isomers thereof.

In addition, in the structure of the above-described lactide copolymer, the soft segment of the polyether polyol repeating unit included in the block copolymer repeating unit represented by Chemical Formula 1 may be a repeating unit derived from a polyether polyol polymer, for example, a C2 to C8 polyalkylene glycol. More specifically, the polyether polyol repeating unit may be a polyalkylene glycol repeating unit selected from the group consisting of a polyethylene glycol (PEG) repeating unit, a poly(1,2-propylene glycol) repeating unit, a poly(1,3-propanediol) repeating unit, and a polytetramethylene glycol repeating unit, more preferably, may be a poly(1,2-propylene glycol) repeating unit or a poly(1,3-propylene)glycol repeating unit.

Meanwhile, as described above, when the melt index of the lactide copolymer according to an exemplary embodiment of the present invention is measured under a load of 2.16 kg and at a temperature between about 170☐ and 210☐, or at a temperature between about 170☐ and 190☐, the melt index y (MI; g/10 min) according to a temperature of x☐ may satisfy the specific relationship: about $0.0043x^2-1.3026x+99.2 \leq y \leq $ about $0.04x^2-13.06x+1073.7$. As the relationship is satisfied, the lactide copolymer may exhibit excellent processability and excellent productivity as products such as a film, and the like.

Here, the melt index of the lactide copolymer may be measured by injecting about 5 g of the lactide copolymer while applying a load of about 2.16 kg in a cylinder which is set at a temperature of about 170☐ to 210☐. The lactide copolymer may be injected into the cylinder, heated for about 4 minutes to melt the lactide copolymer, and pressed by a weight of about 2.16 kg to allow the lactide copolymer to be discharged from the cylinder. Here, about 2 g of the lactide copolymer which is initially discharged is discarded, and a weight of the remaining lactide copolymer discharged for about 60 seconds is actually measured, and the measured weight is converted into g/10 min which is a unit of the melt index, thereby measuring the melt index for each temperature. A relationship of the melt index y (MI; g/10 min) according to x☐ may be deduced from linear regression by measuring the MI for each temperature, for example, about 170☐, about 175☐, about 180☐, about 185☐, about 190☐, about 200☐ and about 210☐, with respect to the same lactide copolymer, and whether or not this relationship satisfies the above-described relationship: about $0.0043x^2-1.3026x+99.2 \leq y \leq $ about $0.04x^2-13.06x+1073.7$ may be confirmed.

Whether or not the specific relationship is satisfied may depend on a content and a molecular weight of the soft segment of the lactide copolymer, the specific linking structure of the block copolymer repeating unit, and the like, and when the lactide copolymer satisfies the specific relationship, the lactide copolymer may have more excellent processability and more excellent product productivity as described above.

In the lactide copolymer according to an exemplary embodiment, the melt index measured under a load of about 2.16 kg and at an optional temperature between about 170☐ and 210☐, or any temperature between about 170☐ and 190☐ may be about 1.0 to 40.0, or about 1.7 to 35.0, or about 1.8 to 30.0. More specifically, in the lactide copolymer, the MI measured under a load of about 2.16 kg and at a temperature of about 170☐ may be about 1.7 to 10.0, or about 1.8 to 9.0, the MI measured at a temperature of about 180☐ may be about 3.0 to 20.0, or about 4.0 to 18.0, and the MI measured at a temperature of about 190☐ may be about 8.0 to about 35.0, or about 8.5 to 30.0.

When the MI range for each temperature is satisfied, excellent fluidity at the time of performing an extrusion molding process for manufacturing a film, and the like, and more improved processability accordingly may be exhibited, and a minimum load with respect to the extruder screw may be applied to exhibit improved product productivity.

Meanwhile, in the above-described lactide copolymer, each of the block copolymer repeating units represented by Chemical Formula 1 above may have a weight average molecular weight of about 50,000 to 200,000, or about 70,000 to 180,000. Therefore, the lactide copolymer may have a large molecular weight, such that the lactide copolymer, the film obtained therefrom, and the like, may exhibit mechanical physical properties such as more improved strength, and the like.

In addition, each of the polyether polyol repeating units included in the lactide copolymer may have a number average molecular weight of about 2,000 to 15,000, or about 2,000 to 13,000, or about 3,000 to 10,000. The polyether polyol repeating unit having the above-described range of the large molecular weight is included as the soft segment, such that the lactide copolymer and the film, and the like, including the lactide copolymer may exhibit and maintain more excellent flexibility, and due to the large molecular weight of the lactide copolymer, the products such as the film, and the like, obtained from the lactide copolymer, may exhibit excellent mechanical physical properties.

In addition, in the above-described lactide copolymer, the block copolymer repeating unit may include about 50 to 95 wt % or about 60 to 90 wt % of the hard segment and a residual amount of the soft segment, for example, about 5 to 50 wt % or about 10 to 40 wt % of the soft segment. If the content of the hard segment is extremely low, the lactide copolymer and the film, and the like, including the same may have deteriorated mechanical physical properties such as strength, and the like. On the contrary, when the content of the hard segment is extremely high, or the content of the soft segment is extremely low, the lactide copolymer may have deteriorated flexibility. The film, and the like, obtained from the lactide copolymer having a content out of the range according to the present invention may have deteriorated flexibility and the lactide copolymer having a content out of the range may have decreased processability, which is difficult to be appropriately applied.

Meanwhile, as described below in more detail, the lactide copolymer may be obtained by ring opening polymerization of a lactide monomer using a specific catalyst, in the presence of the polyether polyol repeating unit functioning as a kind of macro initiator. The specific catalyst may be an organic metal composite represented by Chemical Formula 2 below or a catalyst including a mixture of a compound represented by Chemical Formula 3 below and a compound represented by Chemical Formula 4 below:

[Chemical Formula 2]

[Chemical Formula 3]

[Chemical Formula 4]

$MX_pY_{2-p}$

In Chemical Formula 2 to 4 above, n is an integer of 0 to 15, p is an integer of 0 to 2, M is Sn or Zn, $R^1$ and $R^3$ may be the same as or different from each other, and are each hydrogen, substituted or unsubstituted C3 to C10 alkyl, substituted or unsubstituted C3 to C10 cycloalkyl, substituted or unsubstituted C6 to C10 aryl, $R^2$ is substituted or unsubstituted C3 to C10 alkylene, substituted or unsubstituted C3 to C10 cycloalkylene, substituted or unsubstituted C6 to C10 arylene, and X and Y are each independently an alkoxy group or a carboxyl group.

The hard segments may be formed by ring opening polymerization of the lactide monomer using the catalyst, and may be copolymerized with the soft segments derived from the macro-initiator to obtain the block copolymer repeating units, and the block copolymer repeating units may be linked with each other to prepare the copolymer according to an exemplary embodiment of the present invention.

However, the specific catalyst may have significantly excellent polymerization activity as compared to the existing materials, which allows the polylactide repeating unit having a large molecular weight to be prepared even with a small amount of the specific catalyst. Therefore, the lactide copolymer may have a large molecular weight of the hard segments and the soft segments and may have the above-described large weight average molecular weight due to the structure in which the block copolymer repeating units represented by Chemical Formula 1 above are linked with each other. Therefore, the lactide copolymer may exhibit excellent mechanical physical properties.

In addition, due to the excellent activity of the catalyst, and the like, the lactide copolymer may be prepared with a smaller amount of the catalyst, and a residual metal amount of the lactide copolymer, that is, tin or zinc residual amount derived from the catalyst may also be decreased to be about 20 ppm or less, or about 4 to 20 ppm. As a result, a possibility in which mechanical physical properties of the lactide copolymer are deteriorated by depolymerization or degradation of the residual catalyst (metal), and the like, may be significantly decreased, and a possibility of pollution or toxicity by the residual metal does not substantially exist.

In addition, at the time of using the composite catalyst represented by Chemical Formula 2 above, a content of the residual carbodiimide-based component derived from the catalyst, that is, a remaining component except for $MX_pY_{2-p}$, may be less than about 0.2 wt %, or less than about 0.15 wt %, and at the time of using the mixture catalyst of Chemical Formula 3 and Chemical Formula 4, a content of the residual carbodiimide-based component represented by Chemical Formula 3 may be about 0.2 wt % or less, or about 0.15 wt % or less.

In addition, the lactide copolymer may include tin or zinc residual metal derived from the catalyst as a catalyst form, that is, the organic metal composite represented by Chemical Formula 2 above or the residual catalyst form including the mixture of a compound represented by Chemical Formula 3 above and a compound represented by Chemical Formula 4, wherein $MX_pY_{2-p}$ of Chemical Formula 2 or $MX_pY_{2-p}$ of Chemical Formula 4 may be tin(II) 2-ethyl hexanoate(Sn $(Oct)_2$).

In addition, the lactide copolymer may include a residual lactide monomer having an amount of about 1.0 wt % or less, for example, about 0.8 wt % or less, based on a weight of the lactide copolymer.

As described above, the residual catalyst (metal, and the like) or the residual lactide monomer may have a low content, and a large molecular weight and excellent mechanical physical properties may be provided, such that the lactide copolymer may suppress degradation or depolymerization while being processed or used, and may exhibit and maintain excellent mechanical physical properties such as strength, and the like. In addition, the pollution or toxicity caused by the residual catalyst or the monomer may also be minimized. As a result, the lactide copolymer may be significantly preferably used as various packaging materials.

The above-described lactide copolymer includes two or more of the block copolymer repeating units including the hard segment-soft segment-hard segment consisting of the polylactide repeating unit—the polyether polyol repeating unit—the polylactide repeating unit to exhibit specific biodegradability of a biomass-based resin. Due to the biodegradability of the lactide copolymer, and the like, the film, and the like, obtained therefrom may also exhibit excellent biodegradability.

In addition, the lactide copolymer according to an exemplary embodiment of the present invention may include a structure in which the block copolymer repeating units are linked with each other via a predetermined number of urethane linking groups, such that the molecular weight of the resin may be easily controlled. Therefore, the lactide copolymer may exhibit more improved mechanical physical properties due to a high molecular weight. In addition, the lactide copolymer has the linking structure via the specific urethane linking group to simultaneously satisfy an appropriate melt index, and excellent processability and productivity.

Further, the lactide copolymer may include the soft segments of polyether polyol repeating units to exhibit remarkably improved flexibility (for example, high elongation) and excellent transparency property.

Therefore, the above-described lactide copolymer may be preferably used as packaging materials of various fields, including food packaging materials (film, and the like).

Meanwhile, the above-described lactide copolymer may be prepared by including forming a block copolymer represented by Chemical Formula 1a by ring opening polymerization of the lactide monomer, in the presence of the tin- or zinc-containing catalyst and the initiator including the polyether polyol polymer. In addition, the method may further include reacting the block copolymer represented by Chemical Formula 1a with a polyvalent isocyanate compound having 2 or more equivalents of an isocyanate group per a molecule:

[Chemical Formula 1a]

in Chemical Formula 1a, D is a C2 to C10 linear or branched alkylene group, x is each independently an integer of 30 to 500, and n is an integer of 30 to 1000.

According to the preparation method, in a first step, the hard segments of polylactide repeating units are formed and bound to the polyether polyol polymer, thereby preparing the block copolymer represented by Chemical Formula 1a, and in a second step, the block copolymer is bound to the polyvalent isocyanate compound to prepare the lactide copolymer in which the block copolymer repeating units are linked with each other via the urethane linking group.

Here, the polyether polyol copolymer functions as a kind of macro-initiator at the time of forming the polylactide repeating unit which is the hard segment. That is, the macro-initiator may be bound to the lactide monomer with the organic metal catalyst to initiate the ring opening reaction, and the chains may be continuously extended to form the hard segments and the block copolymer including the same. That is, since the hydroxy groups at both ends of the polyether polyol polymer serve to initiate the ring opening polymerization and extend the chains, the block copolymer formed therefrom may have a structure in which the hard segments are bound to both ends of the polyether polyol polymer, that is, the soft segment.

Therefore, the block copolymer formed as described above may react with the polyvalent isocyanate compound to prepare the lactide copolymer according to an exemplary embodiment of the present invention.

In the preparation method, the tin- or zinc-containing catalyst may be the organic metal composite represented by Chemical Formula 2 or the catalyst including the mixture of a compound represented by Chemical Formula 3 and a compound represented by Chemical Formula 4. By using the specific catalyst, the lactide copolymer prepared by the preparation method may satisfy a low content of the residual metal and a high molecular weight, and may achieve excellent general physical properties. As a result, the lactide copolymer may have a large molecular weight and excellent mechanical physical properties obtained from the large molecular weight as compared to the related art, and have a low content of the residual metal to suppress degradation while being used, thereby exhibiting more improved hydrolysis resistance and thermal resistance. The reason is because the catalyst exhibits excellent polymerization activity as compared to the existing catalysts to prepare the hard segment and the lactide copolymer having the large molecular weight even with a small amount of the used catalyst.

That is, due to excellent activity of the catalyst, the lactide copolymer having a larger molecular weight may be prepared even with a small amount of catalyst, and may also be obtained in a state in which depolymerization or degradation is suppressed during polymerization or after the polymerization. Therefore, since the amount of the monomer and the catalyst remaining in the lactide copolymer after the polymerization may be minimized, more excellent mechanical physical properties may be exhibited, and excellent hydrolysis resistance may be exhibited under high temperature and high moisture conditions.

In addition, the lactide copolymer has acidity lower than that of the previously known lactide copolymers. Therefore, degradation or a decrease in a molecular weight while using the lactide copolymer or the product obtained therefrom may be prevented, such that more improved hydrolysis resistance or thermal resistance may be exhibited. In addition, more excellent mechanical and physical properties of the lactide copolymer may be maintained.

Non-limited principles and reasons thereof are described as follows.

In the preparation method of the lactide (co)polymer, for example, tin- or zinc-containing catalyst for ring opening polymerization is used, wherein a portion of the catalyst unavoidably remains in the finally prepared (co)polymer. However, the remaining catalyst may be bound to ends of the (co)polymer, and this composite and a carboxylic acid, and the like, may generate a trans-esterification reaction, and the like, which may cause degradation or a decrease in a molecular weight of the (co)polymer. In addition, the remaining lactide monomer may be easily hydrolyzed under high temperature and high moisture conditions to generate the carboxylic acid and promote hydrolysis of the (co)polymer, thereby causing the decrease in a molecular weight.

Meanwhile, as described above, the lactide copolymer prepared as described above may have a low content of the remaining metal derived from the catalyst and a low content of the remaining lactide monomer, and may have a high molecular weight. Therefore, degradation or the decrease in a molecular weight caused by the remaining metal or the remaining lactide monomer may be minimized, and excellent mechanical physical properties due to the high molecular weight may be exhibited and maintained.

Meanwhile, in the above-described preparation method of the lactide copolymer, L-lactide or D-lactide which is a cyclic monomer obtained from L-polylactic acid or D-polylactic acid may be used as the lactide monomer. More preferably, as the lactide monomer, it is preferable to use L-lactide or D-lactide raw materials having an optical purity of 98% or more in view of a melting temperature and thermal resistance of the lactide copolymer.

In addition, as the polyether polyol polymer, C2 to C8 polyalkylene glycol having a number average molecular weight of about 2,000 to 15,000, or about 2,000 to 13,000, or about 3,000 to 10,000 may be used, and specifically, may be polyalkylene glycol selected from the group consisting of polyethylene glycol (PEG), poly(1,2-propyleneglycol), poly(1,3-propanediol), and polytetramethylene glycol.

In addition, the ring opening polymerization may be performed at a temperature of about 120 to 200□, or about 120 to 190□ for about 0.5 to 8 or about 1 to 7 hours.

Further, the composite represented by Chemical Formula 2 or the mixture of Chemical Formulas 3 and 4 may be used as the catalyst in the ring opening polymerization, wherein the catalyst may be used at a ratio of about 1:10,000 to 1:200,000 (mole/mole ratio) based on the lactide monomer. If an addition ratio of the catalyst is extremely decreased, the polymerization activity is not sufficient which is not preferable, and on the contrary, if an addition ratio of the catalyst is extremely increased, the residual catalyst amount of the prepared lactide copolymer is increased, which may cause degradation or decrease in a molecular weight of the copolymer, and the like.

In addition, in the step of reacting the block copolymer with the polyvalent isocyanate compound after the ring opening polymerization, an isocyanate compound having more than about 2 equivalents or more than about 2 to less than 3 equivalents of an isocyanate group may be used as the polyvalent isocyanate compound, which is the same as described above, and therefore, more details thereof will be omitted.

Further, the polyvalent isocyanate compound may be used in an amount of about 0.05 to 5 parts by weight, or about 0.1 to 4 parts by weight, or about 0.2 to 2 parts by weight based on 100 parts by weight of the block copolymer represented by Chemical Formula 1a above. When the amount of the used polyvalent isocyanate compound is extremely decreased, the molecular weight, the viscosity or the mechanical physical properties of the lactide copolymer may not be sufficiently obtained, and on the contrary, when the amount there of is extremely increased, gel may be formed due to the excessively increased molecular weight of the lactide copolymer.

Further, the reaction with the polyvalent isocyanate compound may be performed at a temperature of about 100 to 190□ for about 0.001 to 1 hour. However, the reaction condition is not specifically limited as long as it is general reaction conditions forming the urethane bond.

In addition, the reaction with the polyvalent isocyanate compound may be performed in the presence of a tin-based catalyst. Representative examples of the tin-based catalyst may include stannous octoate, dibutyltin dilaurate, dioctyltin dilaurate, and the like.

According to the preparation method, the lactide copolymer having excellent mechanical physical properties, flexibility, processability, and the like, due to predetermined structural properties, a high molecular weight, an appropriate melt index, and the like, for example, the lactide copolymer according to an exemplary embodiment of the present invention, may be prepared at a high conversion rate.

Meanwhile, there is provided a resin composition including the above-described lactide copolymer according to another exemplary embodiment of the present invention.

The resin composition includes the lactide copolymer exhibiting excellent mechanical physical properties, flexibility, hydrolysis resistance, thermal resistance, and the like, to exhibit excellent physical and mechanical properties, which is preferably used with semi-permanent usages such as food packaging films, sheets, flooring materials, electronic product packaging, car interior materials, or the like.

In addition, the resin composition may further include various additives included in various resin compositions.

Further, the resin composition may be prepared as a liquid-phase or a solid-phase resin composition before molding a final product, or may be a plastic, a fiber, or the like, in a final product state, wherein the final plastic, fiber product, or the like, may be prepared by general methods according to each product type.

In particular, when the above-described resin composition is molded as the film, the manufactured film may have excellent transparency, and in particular, a low content of residual metals to decrease toxicity and significantly improved flexibility, which may be effectively used as a food packaging film, as compared to the related art. Therefore, the packaging film may be preferably applied as packaging materials of various fields. For example, the film prepared by using the lactide copolymer according to the present invention may be widely used as industrial packaging materials such as agricultural mulching film, automotive protective film sheets, garbage bags, compost pockets, and the like, as well as living consumer goods, or grocery packaging papers/bags, chilled/frozen food packaging, shrinkable over-wrapping films, films for bundle, personal hygiene items such as sanitary pads or baby products, lamination films, and mat films for shrinkable label packaging and snack packing.

Advantageous Effects of Invention

The lactide copolymer according to the present invention may exhibit excellent flexibility, thermal resistance, and processability while expressing and maintaining excellent mechanical physical properties, and may have few pollution or toxicity caused by residual catalysts and monomers. In particular, the lactide copolymer may have excellent melting processability and may decrease a load applied to an extruder at the time of performing a melting and extrusion process for manufacturing a film, and the like, such that productivity of products such as the film, and the like, may be significantly increased. Therefore, the lactide copolymer may be preferably applied as various packaging materials such as a food packaging material, and the like. In particular, the film including the lactide copolymer may be preferably applied to a food packaging product, and may be used as materials of various fields which are semi-permanently used, such as electronic product packaging or interior materials for vehicle as well as disposable products such as films and sheets for household.

EXAMPLES

Hereinafter, actions and effects of the present invention will be described in more detail by specific examples of the present invention. Meanwhile, the Examples are provided only to illustrate the present invention, and the scope of the invention is not limited thereto.

[Experimental Method]

In the following Examples and Comparative Examples, all operations dealing with compounds sensitive to air or water were carried out using standard Schlenk technique or dry box techniques.

In addition, definition and measuring methods of each physical property in Examples to be described below are summarized below.

(1) Content (wt %) of Polylactide and Polyether Polyol Repeating Units Contents of each repeating unit in the block copolymer repeating units included in each prepared lactide copolymer are weighed through $^1$H NMR using 600 Mhz nuclear magnetic resonance (NMR) spectrometer.

(2) Molecular Weight and Molecular Weight Distribution: A molecular weight and a molecular weight distribution of the polymer were measured by using gel permeation chromatography (GPC), wherein a polystyrene sample was used as a standard one.

Synthesis Example 1

Sn(Oct)$_2$ (Aldrich Co.) (0.2 g, 0.49 mmol) and a compound represented by Chemical Formula 5 below (TCI Co.) (0.36 g, 1.0 mmol) were put into a 100 mL flask, respectively, 30 mL of toluene was put thereinto, and stirred at 100☐ for 1 hour. Then, after a solvent was removed under vacuum, the obtained product was washed with a heptane solvent and dried to obtain 0.36 g of an organic metal composite A.

[Chemical Formula 5]

Synthesis Example 2

Sn(Oct)$_2$ (Aldrich Co.) (0.2 g, 0.49 mmol) and a compound represented by Chemical Formula 6 below (LineChemi Co.) (0.36 g) were put into a 100 mL flask, respectively, to obtain 0.4 g of an organic metal composite B by the same method as Synthesis Example 1.

Referring to $^{13}$C NMR spectrum with respect to the organic metal composite B, three carbonyl peaks in the reaction of the Sn(Oct)$_2$ catalyst and the compound represented by Chemical Formula 6 were shown at δ 188, 183, and 182 ppm, wherein the significantly sharp peak shown at δ 183 corresponds to Oct-H acid compound bound to the compound represented by Chemical Formula 6, the wide peak shown at δ 188 ppm corresponds to free Sn(Oct)$_2$, and the wide peak shown at δ 182 ppm corresponds to the organic metal composite having the coordinated compound represented by Chemical Formula 6:

[Chemical Formula 6]

n = 10 ~ 12

Example 1

An L-lactide monomer (755 g, 5.24 mol) and the organic metal composite A (0.83 g) prepared in Synthesis Example 1 were put into a reactor provided with a nitrogen-introducing tube, a stirrer, a catalyst inlet and a vacuum system, then polypropylene glycol (a number average molecular weight of 6,000 g/mol, 133 g) was put thereinto, followed by ring opening polymerization at a temperature of 180☐ for 3 hours, to prepare a block copolymer represented by Chemical Formula 1a. Some polymerization resins were sampled in a reactor and a weight average molecular weight thereof was measured by gel permeation chromatography (GPC), wherein the weight average molecular weight was 88,000.

Then, 4.4 g of a polyvalent isocyanate compound (a mixture of MDI having 2.0 equivalents of an isocyanate group and hexamethylene diisocyanate isocyanurate having 3.0 equivalents of an isocyanate group) having about 2.7 equivalents of an average isocyanate group per a molecule was put into a polymerization reactor, and followed by an additional polymerization reaction with the block copolymer represented by Chemical Formula 1a at a temperature of 180☐ for 10 minutes to form a urethane linking group.

Figure 1:
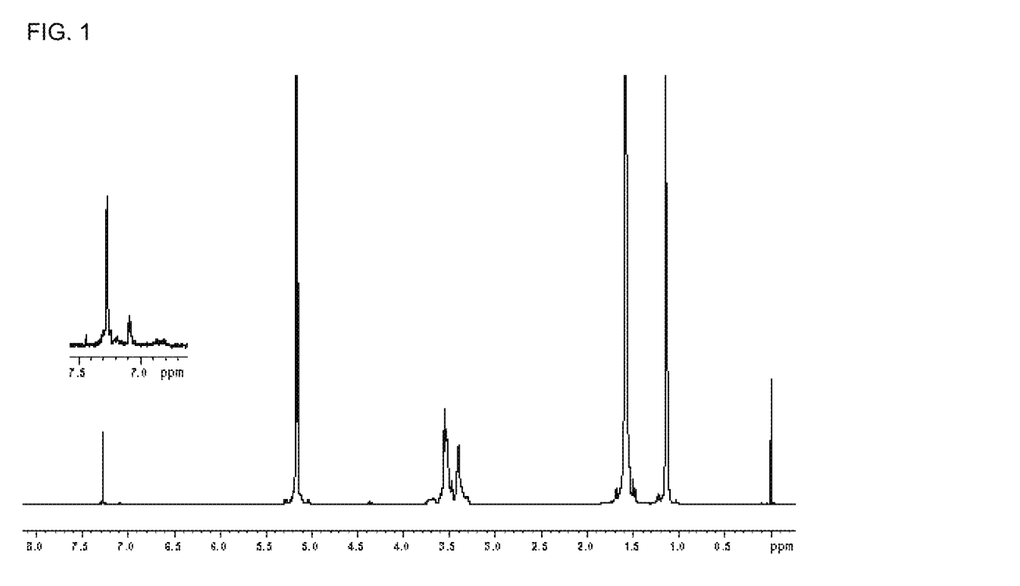
FIG. 1 is $^1$H NMR spectrum of a lactide copolymer of Example 1.

After the reaction was completed, residual lactide was removed by general volatilization process to prepare a lactide copolymer including two or more of the block copolymer repeating units represented by Chemical Formula 1, and then a weight average molecular weight and a molecular weight distribution measured with respect to the prepared lactide copolymer were Mw=about 200,000 g/mol, PDI=about 2.3, and a content of the polylactide repeating unit (hard segment) and a content of polyether polyol repeating unit (soft segment) in the block copolymer repeating units were 85 wt % and 15 wt %, respectively. $^1$H NMR spectrum of the lactide copolymer according to Example 1 is shown in FIG. 1.

Example 2

An L-lactide monomer (755 g, 5.24 mol) and the organic metal composite A (0.83 g) prepared in Synthesis Example 1 were put into a reactor provided with a nitrogen-introducing tube, a stirrer, a catalyst inlet and a vacuum system, then polypropylene glycol (a number average molecular weight of 6,000 g/mol, 133 g) was put thereinto, followed by ring opening polymerization at a temperature of 180☐ for 3 hours, to prepare a block copolymer represented by Chemical Formula 1a. Some polymerization resins were sampled in a reactor and a weight average molecular weight thereof was measured by gel permeation chromatography (GPC), wherein the weight average molecular weight was 85,000.

Then, 3.5 g of a polyvalent isocyanate compound (a mixture of MDI having 2.0 equivalents of an isocyanate group and hexamethylene diisocyanate isocyanurate having 3.0 equivalents of an isocyanate group) having about 2.7 equivalents of an average isocyanate group per a molecule was put into a polymerization reactor, and followed by an additional polymerization reaction with the block copolymer represented by Chemical Formula 1a at a temperature of 180☐ for 10 minutes to form a urethane linking group.

After the reaction was completed, residual lactide was removed by general volatilization process to prepare a lactide copolymer including two or more of the block copolymer repeating units represented by Chemical Formula 1, and then a weight average molecular weight and a molecular weight distribution measured with respect to the prepared lactide copolymer were Mw=about 159,000 g/mol, PDI=about 2.1, and a content of the polylactide repeating unit (hard segment)

and a content of polyether polyol repeating unit (soft segment) in the block copolymer repeating units were 85 wt % and 15 wt %, respectively.

Example 3

An L-lactide monomer (755 g, 5.24 mol) and the organic metal composite A (0.83 g) prepared in Synthesis Example 1 were put into a reactor provided with a nitrogen-introducing tube, a stirrer, a catalyst inlet and a vacuum system, then polypropylene glycol (a number average molecular weight of 6,000 g/mol, 133 g) was put thereinto, followed by ring opening polymerization at a temperature of 180☐ for 3 hours, to prepare a block copolymer represented by Chemical Formula 1a. Some polymerization resins were sampled in a reactor and a weight average molecular weight thereof was measured by gel permeation chromatography (GPC), wherein the weight average molecular weight was 87,000.

Then, 6.2 g of a polyvalent isocyanate compound (a mixture of MDI having 2.0 equivalents of an isocyanate group and hexamethylene diisocyanate isocyanurate having 3.0 equivalents of an isocyanate group) having about 2.7 equivalents of an average isocyanate group per a molecule was put into a polymerization reactor, and followed by an additional polymerization reaction with the block copolymer represented by Chemical Formula 1a at a temperature of 180☐ for 10 minutes to form a urethane linking group.

After the reaction was completed, residual lactide was removed by general volatilization process to prepare a lactide copolymer including two or more of the block copolymer repeating units represented by Chemical Formula 1, and then a weight average molecular weight and a molecular weight distribution measured with respect to the prepared lactide copolymer were Mw=about 248,000 g/mol, PDI=about 2.5, and a content of the polylactide repeating unit (hard segment) and a content of polyether polyol repeating unit (soft segment) in the block copolymer repeating units were 85 wt % and 15 wt %, respectively.

Example 4

An L-lactide monomer (755 g, 5.24 mol) and the organic metal composite A (0.83 g) prepared in Synthesis Example 1 were put into a reactor provided with a nitrogen-introducing tube, a stirrer, a catalyst inlet and a vacuum system, then polypropylene glycol (a number average molecular weight of 6,000 g/mol, 133 g) was put thereinto, followed by ring opening polymerization at a temperature of 180☐ for 3 hours, to prepare a block copolymer represented by Chemical Formula 1a. Some polymerization resins were sampled in a reactor and a weight average molecular weight thereof was measured by gel permeation chromatography (GPC), wherein the weight average molecular weight was 83,000.

Then, 1.7 g of a polyvalent isocyanate compound (a mixture of MDI having 2.0 equivalents of an isocyanate group and hexamethylene diisocyanate isocyanurate having 3.0 equivalents of an isocyanate group) having about 2.7 equivalents of an average isocyanate group per a molecule was put into a polymerization reactor, and followed by an additional polymerization reaction with the block copolymer represented by Chemical Formula 1a at a temperature of 180☐ for 10 minutes to form a urethane linking group.

After the reaction was completed, residual lactide was removed by general volatilization process to prepare a lactide copolymer including two or more of the block copolymer repeating units represented by Chemical Formula 1, and then a weight average molecular weight and a molecular weight distribution measured with respect to the prepared lactide copolymer were Mw=about 103,000 g/mol, PDI=about 1.9, and a content of the polylactide repeating unit (hard segment) and a content of polyether polyol repeating unit (soft segment) in the block copolymer repeating units were 85 wt % and 15 wt %, respectively.

Example 5

An L-lactide monomer (755 g, 5.24 mol) and the organic metal composite A (0.83 g) prepared in Synthesis Example 1 were put into a reactor provided with a nitrogen-introducing tube, a stirrer, a catalyst inlet and a vacuum system, then polypropylene glycol (a number average molecular weight of 6,000 g/mol, 133 g) was put thereinto, followed by ring opening polymerization at a temperature of 180☐ for 3 hours, to prepare a block copolymer represented by Chemical Formula 1a. Some polymerization resins were sampled in a reactor and a weight average molecular weight thereof was measured by gel permeation chromatography (GPC), wherein the weight average molecular weight was 88,000.

Then, 4.2 g of a polyvalent isocyanate compound (a mixture of MDI having 2.0 equivalents of an isocyanate group and hexamethylene diisocyanate isocyanurate having 3.0 equivalents of an isocyanate group) having about 2.7 equivalents of an average isocyanate group per a molecule was put into a polymerization reactor, and followed by an additional polymerization reaction with the block copolymer represented by Chemical Formula 1a at a temperature of 180☐ for 10 minutes to form a urethane linking group.

After the reaction was completed, residual lactide was removed by general volatilization process to prepare a lactide copolymer including two or more of the block copolymer repeating units represented by Chemical Formula 1, and then a weight average molecular weight and a molecular weight distribution measured with respect to the prepared lactide copolymer were Mw=about 194,000 g/mol, PDI=about 2.2, and a content of the polylactide repeating unit (hard segment) and a content of polyether polyol repeating unit (soft segment) in the block copolymer repeating units were 85 wt % and 15 wt %, respectively.

Example 6

An L-lactide monomer (755 g, 5.24 mol) and the organic metal composite A (0.83 g) prepared in Synthesis Example 1 were put into a reactor provided with a nitrogen-introducing tube, a stirrer, a catalyst inlet and a vacuum system, then polypropylene glycol (a number average molecular weight of 6,000 g/mol, 133 g) was put thereinto, followed by ring opening polymerization at a temperature of 180☐ for 3 hours, to prepare a block copolymer represented by Chemical Formula 1a. Some polymerization resins were sampled in a reactor and a weight average molecular weight thereof was measured by gel permeation chromatography (GPC), wherein the weight average molecular weight was 88,000.

Then, 8.5 g of a polyvalent isocyanate compound (a mixture of MDI having 2.0 equivalents of an isocyanate group and hexamethylene diisocyanate isocyanurate having 3.0 equivalents of an isocyanate group) having about 2.7 equivalents of an average isocyanate group per a molecule was put into a polymerization reactor, and followed by an additional polymerization reaction with the block copolymer represented by Chemical Formula 1a at a temperature of 180☐ for 10 minutes to form a urethane linking group.

After the reaction was completed, residual lactide was removed by general volatilization process to prepare a lactide copolymer including two or more of the block copolymer repeating units represented by Chemical Formula 1, and then a weight average molecular weight and a molecular weight distribution measured with respect to the prepared lactide copolymer were Mw=about 423,000 g/mol, PDI=about 2.8, and a content of the polylactide repeating unit (hard segment) and a content of polyether polyol repeating unit (soft segment) in the block copolymer repeating units were 85 wt % and 15 wt %, respectively.

Comparative Example 1

A polylactide resin (Mw=200,000 g/mol) of 4032D (NatureWorks) was used as Comparative Example 1.

Comparative Example 2

A polylactide resin (Mw=150,000 g/mol) of 4032D (NatureWorks) was used as Comparative Example 2.

Comparative Example 3

A polylactide resin (Mw=164,000 g/mol) of 4032D (NatureWorks) was used as Comparative Example 3.

Comparative Example 4

A polylactide resin (Mw=214,000 g/mol) of 4032D (NatureWorks) was used as Comparative Example 4.

Comparative Example 5

A polylactide resin (Mw=227,000 g/mol) of 4032D (NatureWorks) was used as Comparative Example 5.

Comparative Example 6

A lactide copolymer was prepared by the same method as Example 1 except for using 4.4 g of hexamethylene diisocyanate isocyanurate having 3.0 equivalents of an isocyanate group and without using MDI.

Meanwhile, in Comparative Example 6, the copolymer having an excessive amount of gel was prepared, that is, it was confirmed that a sample which was appropriate for analysis was not capable of being prepared. When a sample having a large amount of gel was put into an extruder and processed, an outlet was clogged, and a screw was not smoothly operated, and the like, such that it was confirmed that the copolymer of Comparative Example 6 had significantly deteriorated processability. Therefore, additional physical properties of the copolymer of Comparative Example 6 were not evaluated and it was determined that Comparative Example 6 was not actually usable.

Experimental Example 1

Measurement of MI for Each Temperature

About 5 g of each of the lactide copolymers of Examples 1 to 3 and the polylactide resin of Comparative Example 1 was put into a cylinder of Melt Indexer (Toyoseiki) and heated for about 4 minutes to be melted. Here, each cylinder which was set at a temperature of about 170°C, about 175°C, about 180°C, about 185°C, about 190°C, about 200°C and about 210°C, that is, measuring temperatures, was used. Then, the polymer in the cylinder was pressed by a weight of about 2.16 kg to allow the polymer to be discharged from the cylinder. Here, about 2 g of the polymer which was initially discharged is discarded, and a weight of the lactide copolymer discharged for about 60 seconds was actually measured, and the measured weight was converted into g/10 min which is a unit of the melt index, thereby measuring the melt index for each temperature of the lactide copolymers of Examples 1 to 3 and the polylactide resin of Comparative Example 1.

Then, a relationship of the melt index y (MI; g/10 min) according to x°C was deduced from linear regression by measuring the MI for each temperature of about 170°C, about 175°C, about 180°C, about 185°C, about 190°C, about 200°C and about 210°C, with respect to each polymer. This relationship was shown in Table 1 and FIG. 2 with comparison, and an upper limit of about $0.04x^2-13.06x+1073.7$ and a lower limit of about $0.0043x^2-1.3026x+99.2$ with respect to the relationship of Examples were also shown in FIG. 2.

TABLE 1

| Temperature (°C) | Example 1 | Example 2 | Example 3 | Comparative Example 1 | Comparative Example 6 |
|---|---|---|---|---|---|
| | | | Melt Index (g/10 min) | | |
| 170 | 4.5 | 8.2 | 1.8 | 1.6 | Physical properties were not measurable. |
| 175 | 6.0 | 12.2 | Not Measured | Not Measured | |
| 180 | 8.5 | 17.4 | 4.2 | 2.6 | |
| 185 | 12.9 | 21.7 | Not Measured | Not Measured | |
| 190 | 15.1 | 28.8 | 8.6 | 4.5 | |
| 200 | Not Measured | Not Measured | 17.5 | 6.4 | |
| 210 | Not Measured | Not Measured | 30.1 | 10.1 | |

Figure 2:
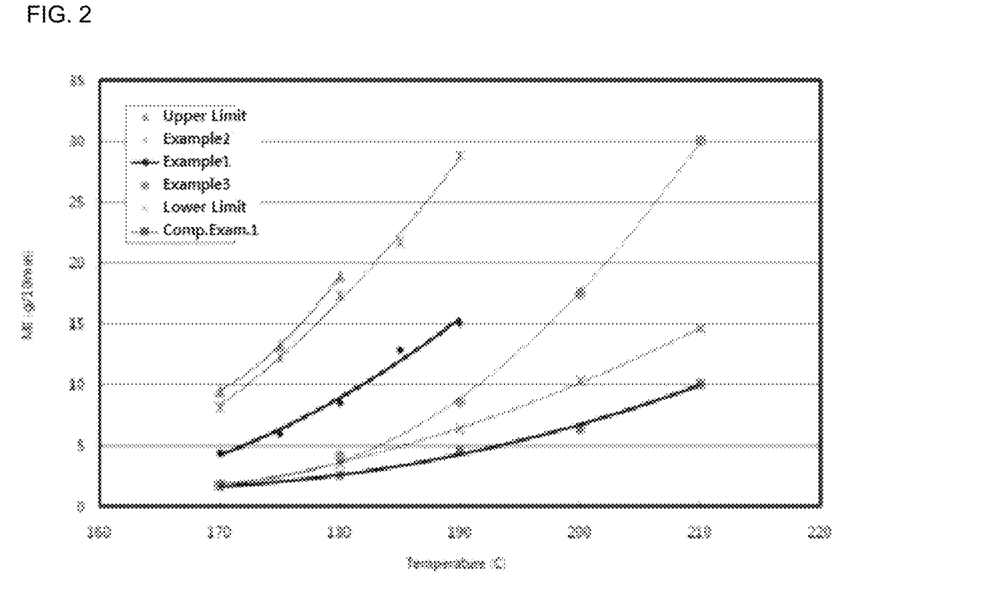
FIG. 2 is a graph illustrating a relationship showing comparison between a temperature and a melt index y(MI; g/10 min) in lactide copolymers of Examples 1 to 3 and a polylactide resin of Comparative Example 1, each MI being measured under a load of 2.16 kg and at a temperature of x□ between 170□ and 210□.

Referring to Table 1 and FIG. 2, it was confirmed that the lactide copolymers of Examples had the MI y (g/10 min) at a temperature of x°C between about 170°C and 210°C satisfying about $0.0043x^2-1.3026x+99.2 \leq y \leq 0.04x^2-13.06x+1073.7$; meanwhile, the polylactide resin of Comparative Example 1 had extremely low MI for each temperature, which did not satisfy the above-described relationship.

In particular, from the above-described difference on the polymers having similar molecular weights to each other, it is considered that the lactide copolymers of Examples had higher fluidity and processability at a temperature between about 170□ and 210□, and the polylactide resin of Comparative Example 1 did not have the fluidity and processability exhibited in Examples.

Experimental Example 2

Measurement of Load with Respect to Extruder Screw

The lactide copolymer of Example 1 and the polylactide resin of Comparative Example 1 were put into a Ba-11 twin screw compound extruder (Bow-Tech Co., Ltd), followed by an extrusion and molding process to manufacture a film. The polymers of Example 1 and Comparative Example 1 were extruded in the extruder at temperatures for each section shown in Table 2 below and then, pressure generated in head was measured. The measurement results were shown in Table 3 below.

TABLE 2

|  | HEAD | ZONE1 | ZONE2 | ZONE3 | ZONE4 | ZONE5 | ZONE6 | ZONE7 | Feeder |
|---|---|---|---|---|---|---|---|---|---|
| Set Value (□) | 190 | 190 | 190 | 180 | 170 | 160 | 150 | 95 | 2.0 |
| Actual Value (□) | 190 | 190 | 190 | 180 | 170 | 160 | 150 | 112 | 2.0 |

TABLE 3

| Screw | Example 1 (Mw = 200,000) | | Comparative Example 1 (Mw = 200,000) | |
|---|---|---|---|---|
| Rate (m/s) | Torque (N·m) | Pressure □head | Torque (N·m) | Pressure □head |
| 50 | 15.91~18.18 | 5.6~5.9 | 25.8~33.8 | 15.4~16.4 |
| 100 | 12.81~14.56 | 5.2~5.6 | 20.45~25.41 | 13.6~17.8 |
| 150 | 11.77~13.22 | 3.5~6.6 | 17.15~23.76 | 11.9~13.3 |
| 200 | 11.64~13.53 | 4.2~5.9 | Not measurable due to failure possibility of equipment according to extremely large noise | |

Referring to Table 3, it was confirmed that even though the polymer of Example 1 had a similar molecular weight to that of Comparative Example 1, the copolymer of Example 1 could decrease load applied to the extruder screw to thereby easily increase the rate of the extruder screw and have excellent product productivity for manufacturing a film, and the like, by the extrusion processing.

Meanwhile, in Comparative Example 1, a large load was applied to the extruder screw, such that a discharge pressure of the polymer was large and it was difficult to increase the screw rate, and therefore, product productivity was deteriorated.

The invention claimed is:

1. A lactide copolymer comprising:
   block copolymer repeating units in which hard segments of polylactide repeating units are bound to both ends of soft segments of polyether polyol repeating units, the block copolymer repeating unit being represented by Chemical Formula 1,
   wherein the lactide copolymer has a weight average molecular weight of 150,000 to 300,000, and a melt index y (MI; g/10 min) satisfying $0.0043x^2 - 1.3026x + 99.2 \leq y \leq 0.04x^2 - 13.06x - 1073.7$, the MI being measured under a load of 2.16 kg and at a temperature of x□ between 170□ and 210□:

[Chemical Formula 1]

in Chemical Formula 1, D is a C2 to C10 linear or branched alkylene group, x is each independently an integer of 30 to 500, and n is an integer of 30 to 1000.

2. The lactide copolymer of claim 1, wherein it includes two or more of the block copolymer repeating units linked with each other via a urethane linking group.

3. The lactide copolymer of claim 1, wherein the melt index measured under a load of 2.16 kg and at a temperature of 170□ is 1.7 to 10.0.

4. The lactide copolymer of claim 1, wherein the melt index measured under a load of 2.16 kg and at a temperature of 180□ is 3.0 to 20.0.

5. The lactide copolymer of claim 1, wherein the melt index measured under a load of 2.16 kg and at a temperature of 190□ is 8.0 to 35.0.

6. The lactide copolymer of claim 2, wherein the block copolymer repeating units are linked with each other via the urethane linking group induced from a polyvalent isocyanate compound having more than 2 equivalents of an average isocyanate group per a molecule.

7. The lactide copolymer of claim 6, wherein the urethane linking group includes urethane bonds obtained by a reaction of a terminal hydroxy group derived from the polylactide repeating unit and the isocyanate group derived from the polyvalent isocyanate compound.

8. The lactide copolymer of claim 6, wherein the polyvalent isocyanate compound includes a mixture of a diisocyanate compound and a polyvalent isocyanate compound having 3 or more equivalents of an isocyanate group.

9. The lactide copolymer of claim 8, wherein the diisocyanate compound is selected from the group consisting of ethylene diisocyanate, 1,4-tetramethylene diisocyanate, 1,6-hexamethylene diisocyanate, 1,2-dodecane diisocyanate, cyclohexane-1,3-diisocyanate, cyclohexane-1,4-diisocyanate, 2,4-hexahydrotoluene diisocyanate, 2,6-hexahydrotoluene diisocyanate, hexahydro-1,3-phenylene diisocyanate, hexahydro-1,4-phenylene diisocyanate, perhydro-2,4-diphenylmethane diisocyanate, perhydro-4,4'-diphenylmethane diisocyanate, 1,3-phenylene diisocyanate, 1,4-phenylene diisocyanate, 1,4-stilbene diisocyanate, 3,3'-dimethyl-4,4'-diphenylene diisocyanate, toluene 2,4-diisocyanate (TDI), toluene 2,6-diisocyanate, diphenylmethane-2,4'-diisocyanate (MDI), diphenylmethane-2,2'-diisocyanate, diphenylmethane-4,4'-diisocyanate and naphthylene-1,5-diisocyanate, and
   the polyvalent isocyanate compound having 3 or more equivalents of the isocyanate group is selected from the group consisting of an oligomer of the diisocyanate compound, a polymer of the diisocyanate compound, a cyclic polymer of the diisocyanate compound, hexamethylene diisocyanate isocyanurate (HDI isocyanurate), a triisocyanate compound and isomers thereof.

10. The lactide copolymer of claim 1, wherein each of the block copolymer repeating units has a weight average molecular weight of 50,000 to 200,000.

11. The lactide copolymer of claim 1, wherein the polyether polyol repeating unit is a polyalkylene glycol repeating unit selected from the group consisting of a polyethylene glycol (PEG) repeating unit, a poly(1,2-propylene glycol) repeating unit, a poly(1,3-propanediol) repeating unit, a polytetramethylene glycol repeating unit, and a polybutylene glycol repeating unit.

12. The lactide copolymer of claim 1, wherein each of the polyether polyol repeating units has a number average molecular weight of 2,000 to 15,000.

13. The lactide copolymer of claim 1, wherein the block copolymer repeating unit includes 50 to 95 wt % of the hard segment and 5 to 50 wt % of the soft segment with respect to the total weight.

14. A resin composition comprising the lactide copolymer of claim 1.

15. A film comprising the lactide copolymer of claim 1.

16. The film of claim 15, wherein it is used as a packaging film.

\* \* \* \* \*